(12) United States Patent
Vieri

(10) Patent No.: US 12,184,663 B2
(45) Date of Patent: *Dec. 31, 2024

(54) PORTABLE TRUST RATING METHOD AND SYSTEM

(71) Applicant: Riccardo Vieri, Firenza (IT)

(72) Inventor: Riccardo Vieri, Firenza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/206,061

(22) Filed: Jun. 5, 2023

(65) Prior Publication Data

US 2023/0319060 A1 Oct. 5, 2023

Related U.S. Application Data

(63) Continuation of application No. 16/387,746, filed on Apr. 18, 2019, now Pat. No. 11,671,432.

(51) Int. Cl.
| | |
|---|---|
| *G06Q 30/02* | (2023.01) |
| *G06Q 20/06* | (2012.01) |
| *G06Q 20/38* | (2012.01) |
| *G06Q 30/0207* | (2023.01) |

(Continued)

(52) U.S. Cl.
CPC ......... *H04L 63/126* (2013.01); *G06Q 20/065* (2013.01); *G06Q 20/389* (2013.01); *G06Q 30/0236* (2013.01); *G06Q 30/0269* (2013.01); *G06Q 2220/00* (2013.01)

(58) Field of Classification Search
CPC .... G06Q 30/02; G06Q 20/065; G06Q 20/389; G06Q 30/0236; G06Q 30/0269; G06Q 2220/00; G06Q 30/0185; G06Q 50/01; G06Q 30/0254; G06Q 10/067; G06Q 30/0246; G06Q 30/0207; H04L 63/126; H04L 63/0861

See application file for complete search history.

(56) References Cited

U.S. PATENT DOCUMENTS

| | | | |
|---|---|---|---|
| 7,085,777 | B2 | 8/2006 | Beck et al. |
| 8,613,080 | B2 | 12/2013 | Wysopal et al. |
| 9,424,612 | B1 | 8/2016 | Bright et al. |

(Continued)

FOREIGN PATENT DOCUMENTS

| | | |
|---|---|---|
| CN | 110135844 A | 8/2019 |
| IT | 1083539 B | 5/1985 |

(Continued)

OTHER PUBLICATIONS

Yun Liu; Zheng Zhao; Guibing Guo; Xingwei Wang; Zhenhua Tan; Shuang Wang, An Identity Management System Based on Blockchain (English), 2017 15th Annual Conference on Privacy, Security and Trust (PST) (2017, pp. 44-4409), Aug. 1, 2017 ( Year: 2017).*

(Continued)

*Primary Examiner* — Marilyn G Macasiano

(74) *Attorney, Agent, or Firm* — Outlier Patent Attorneys, PLLC

(57) ABSTRACT

A system and method that assigns a portable personal rating based on data verification. The decentralized system and methods operate with algorithms, software, devices, and databases allowing a decentralized distribution of token rewards based on the trust rating of the user. The system uses blockchain technology and is directed to a decentralized trust rating assignment wherein the verified information is saved in a blockchain ecosystem.

20 Claims, 7 Drawing Sheets

(51) Int. Cl.
*G06Q 30/0251* (2023.01)
*H04L 9/40* (2022.01)

(56) References Cited

U.S. PATENT DOCUMENTS

| | | | |
|---|---|---|---|
| 9,544,311 | B2 | 1/2017 | Raepple |
| 9,769,213 | B1 | 9/2017 | Madisetti et al. |
| 9,852,276 | B2 * | 12/2017 | McEvoy .................. H04L 63/08 |
| 9,935,772 | B1 | 4/2018 | Madisetti et al. |
| 10,084,762 | B2 | 9/2018 | Versteeg et al. |
| 10,102,526 | B1 | 10/2018 | Madisetti et al. |
| 10,171,476 | B2 * | 1/2019 | Khan ..................... H04L 9/3234 |
| 10,268,817 | B1 | 4/2019 | Pham et al. |
| 10,469,263 | B2 | 11/2019 | Schukai et al. |
| 10,560,272 | B2 | 2/2020 | Yang et al. |
| 10,789,345 | B1 * | 9/2020 | Larimer ................ H04L 9/0897 |
| 10,949,434 | B1 | 3/2021 | Tirupattur Saravanan et al. |
| 11,025,610 | B2 | 6/2021 | Dasika Venkata Devi et al. |
| 11,051,163 | B1 * | 6/2021 | Smith .................... H04W 12/06 |
| 2003/0157488 | A1 | 8/2003 | Cox et al. |
| 2006/0161781 | A1 | 7/2006 | Rice et al. |
| 2007/0256093 | A1 | 11/2007 | Hiler |
| 2013/0073387 | A1 | 3/2013 | Heath |
| 2014/0193047 | A1 | 7/2014 | Grosz et al. |
| 2015/0047003 | A1 * | 2/2015 | Khan ...................... H04L 63/08 |
| | | | 726/7 |
| 2015/0356523 | A1 | 12/2015 | Madden |
| 2016/0004852 | A1 * | 1/2016 | McEvoy ................ G06F 21/31 |
| | | | 726/7 |
| 2016/0217294 | A1 | 7/2016 | Hornquist Astrand et al. |
| 2016/0301531 | A1 | 10/2016 | Finlow-Bates |
| 2016/0358158 | A1 | 12/2016 | Radocchia et al. |
| 2016/0358187 | A1 | 12/2016 | Radocchia et al. |
| 2017/0046652 | A1 | 2/2017 | Haldenby et al. |
| 2017/0140141 | A1 * | 5/2017 | Yan ........................ G06F 21/32 |
| 2017/0353311 | A1 | 12/2017 | Schukai et al. |
| 2018/0032759 | A1 | 2/2018 | Radocchia et al. |
| 2018/0060496 | A1 | 3/2018 | Bulleit et al. |
| 2018/0075453 | A1 | 3/2018 | Durvasula et al. |
| 2018/0211213 | A1 | 7/2018 | Vivier |
| 2018/0308098 | A1 | 10/2018 | Ebrahimi |
| 2018/0316665 | A1 * | 11/2018 | Caldera ................. H04L 63/104 |
| 2019/0066063 | A1 | 2/2019 | Jessamine |
| 2019/0146965 | A1 | 5/2019 | Zack |
| 2019/0220919 | A1 | 7/2019 | Martinez et al. |
| 2019/0340619 | A1 | 11/2019 | Leong et al. |
| 2020/0226285 | A1 | 7/2020 | Bulleit et al. |
| 2020/0280444 | A1 | 9/2020 | Tang et al. |

FOREIGN PATENT DOCUMENTS

| | | | | |
|---|---|---|---|---|
| JP | | 2010211794 A | 9/2010 | |
| JP | | 2019219780 A | 12/2019 | |
| WO | WO 2016/004420 A1 * | 1/2019 | ............. | G06F 21/31 |

OTHER PUBLICATIONS

Palpunavam Prisha; Han-Foon Neo; Thian-Song Ong; Chuan-Chin Teo, Identity risk analysis in mobile commerce: A novel approach (English), 2018 IEEE Symposium on Computer Applications & Industrial Electronics (ISCAIE) (2018, pp. 185-190), Apr. 1, 2018 (Year: 2018).*

Mohit Gambhir; M.N. doja; Moinuddin, Novel Trust Computation Architecture for Users Accountability in Online Social Networks (English), 2015 IEEE International Conference on Computational Intelligence & Communication technology (2015, pp. 725-731), Feb. 1, 2015 (Year: 2015).*

Deloitte, "Blockchain & Cyber Security: Let's Discuss", Oct. 15, 2016, Retrieved online Feb. 10, 2021: https://www2.deloitte.com/content/dam/Deloitte/tr/Documents/technoloty-media-telecommunications/Blockchain-and-Cyber.pdf.

Ron Shevlin, "Digital Identify in Banking," May 15, 2018, Retrieved online Dec. 27, 2021: https://www.lemonos.com/wp-cotent/uploads/2019/08/white-paper-cornerstone-2018-May 15.pdf.

Global Legal Insights, "Blockchain & Cryptocurrency Regulation," 2019, Retrieved online Jan. 9, 2023: https://www.acc.com/sites/default/files/resources/vl/membersonly/1489775_1.pdf.

* cited by examiner

PORTABLE TRUST RATING METHOD AND SYSTEM

CROSS-REFERENCE TO RELATED APPLICATION

None

FIELD OF INVENTION

The present invention relates to the field of creating an assigned user rating using blockchain technology. More specifically, the invention is directed to a decentralized trust rating assignment where verified information is saved within a blockchain computer system. Further, an innovative method to deliver advertising within a rated user graphic interface is also disclosed.

BACKGROUND

The development of the internet and social world has allowed the spread of false information and the growth of fake profiles. It is now possible to buy false documents and false identities on the Internet. Anyone can open blogs and hide behind servers located in remote areas of the world and protected by non-democratic laws, and write any information. In working relationships, it is difficult to know if our interlocutor tells the truth and has titles and real experience we need.

LinkedIn is the most popular social portal in the world for business. It currently accounts for over 550 million free users, while it seems that 15% of them are Premium users, i.e., peoples or companies that pay for a complete service.

Using LinkedIn, people give visibility to their profile and create a sphere of acquaintances. In the profile, the user can enter his data and characteristics such as the qualification, characteristics of the person or particular abilities, as well as writing public information and uploading photographs.

However, also LinkedIn seems to have some limits from a reputational point of view. From a natural search, we realize that if we look for the famous soccer player Cristiano Ronaldo, 432 results appear, and are undoubtedly fake. Looking for the name of the last president of the United States, Donald Trump, 50 fake profiles appear. They are barely less than those of Barack Obama, 43, 333 for Tom Cruise, and 120 for Angelina Jolie, and so on.

These facts show how easy it is to impersonate names and surnames that are not their own and that even the most significant business portal in the world does not check or verify the data of its users.

Today it is possible to purchase "template" of LinkedIn business profiles within 10 USD. A user who wants to look differently can easily upload a photo that is not his own, show that he drives a car not his own and writing skills and titles that do not belong to him, inflating the database of a portal that can use the professional data of users for various purposes. Being LinkedIn, a professional tool increasingly results in the need for people to be sure to communicate with verified profiles.

Moreover, in today's market, also various systems created to ensure the certainty of the delivery of communications, such as e-mail, have failed because they cannot be integrated and not universally regulated by universal laws. It is not possible today to send an email equivalent to a registered letter of traditional mail.

If untrue information on others' reputation is present on the web, the laws do not help to eliminate the problem. For example, the giant Google only partially applies the law for internet data and other news articles that contain false content cannot be removed for the freedom of information.

If a person is the object of a disgraceful negative reputational campaign, the only solution is to invest money to index themselves better and better. All this is expensive and gives no guarantee of success. Many portals provide trusted solutions to products or professionals or companies using tools such as likes and feedback.

eBay, Amazon, TripAdvisor, allow users to enter feedback. However, even this information is unverified. Anyone, even the same person using simple computer skills, such as using VPNs or private networks, can easily insert dozens of false feedbacks, that is unremoved from site owners.

On other occasions, such as Blockchain projects, feedback can be inspired by "token rewards" or prizes. In these cases, users provide opinions on products or services, insert likes, feedback, and photos, solely because driven by the motivation to receive rewards. On the google search engine, typing the word "bounty hunters" appear 17 million and 500,000 searches, writing "airdrop" are 12 million and 900,000 searches, typing "buy fake profiles" are 186 million searches available, it goes even better with the word "Buy fake review" where 343 million listings go out. For LinkedIn, typing "buy LinkedIn endorsements" appear 9 million 360,000 listings, "buy LinkedIn connections" are 71.900.000 and so on.

Currently, the safest and fastest way to store data and perform shared checks is through Blockchain technology and systems. Saving data privately or publicly in a Blockchain means protecting them and ensuring that they are not prone to manipulation. The Blockchain has passed the reliability of the date/stamp date/stamp tests used by the servers to try, for example, an anteriority for the creation of texts, documents, videos. The Blockchain is an ideal tool today for a secure, decentralized and regularized data management.

Another important aspect is that of targeted advertising. The fact that many users are fake, it prevents optimal penetration and poor ROIs (Return on investments). The ability to convey a message to verified users improves advertising effectiveness. In this way verified users, available to convey the message would become messengers, influencers and men/women image for the advertising company.

Also, the advertising vehicle can also be transmitted directly by the verified user, within the graphic form, so that in some way verified users are "spokespersons" of the advertising message.

Thus there is a need for a system and method that analyzes more data and can provide a trust rating based on verified information.

There is a need for a system and method that using and interacting with different technologies can grant secure data protection and provide a portable technological instrument of a personal rating.

Further, there is also a need for a system that uses verified, trusted ranked users to deliver targeted advertising messages.

SUMMARY OF THE INVENTION

The present invention provides a system and method that assigns a trust rating score based on blockchain data verification, allowing portability of the trust rating service on more devices and means of communications.

The invention also contemplates the usage of algorithms, Artificial Intelligence, Web Spiders and manual processes so to create the very best reliable trust score profile for a verified user.

The present invention provides a system and method for assigning a personal rating by using specific algorithms via a blockchain distributed network. The method allows the data server to receive information from at least one device, wherein the information is analyzed by more application which utilizes one or a plurality of software for creating a rating and validate the same via Blockchain network. The method allows the data server to convert the information received into at least one personal rating. Further, the method allows the data server to send the user at least one token to a blockchain server every time he updates new information correctly. Furthermore, the method allows the blockchain server to send the at least one token to the user's wallet.

According to the invention a server receives information from a user in the form of data and documents. The server uses software that includes the use of technologies including Artificial Intelligence, spider crawlers, and photographic or video analysis with verification of the authenticity of such information. On the basis of the quality and quantity of the information received the software processes a rating and makes it available to the user.

An example of data that the user is providing is his personal ID Document, like a passport or identity card. In this case Artificial Intelligence can verify the document from a data bank in real time or check the format of the document, the integrity of the picture, and other important parameters.

Another example may be a mobile phone number to be verified by a code that users receive on their phone and which needs to be sent to the server to be confirmed.

Another example may be a personal or group of pictures. In this case, an algorithm can verify that pictures were not manipulated, and wherein another algorithm can verify the face and silhouette in between several pictures to verify that the same person matches the information provided.

Another example may be a task requiring to provide personal fingerprints or DNA.

Another example may be a task requiring uploading movements and kinetic energy data recorded by sensors located in the user device.

Another example may be a task requiring updating personal pictures or other personal data.

The system and the method also provide for the use of web spiders in order to analyze some information provided and compare it with collected data. For example, if a user claims to have written novels a crawler searches the information network in this regard. If it finds this information the rating will improve. Further, in some cases, manual analysis of information is also provided.

An algorithm is adapted to take into account these multiple factors and then determine a final ranking that can be updated constantly. For example, verification of a single identity document can receive one rating star. If this verification is achieved with two documents (i.e., a passport and a health card) it can receive 1.25 stars. If the user adds a mobile phone verified by sending a code that the user receives on the phone and entered in an online form the user will receive an additional 0.5 stars to the rating. If the user then uploads one photograph that is verified and compatible with the one used in their passport there is an additional 0.25 stars added. If three more photos of which one is in a group a further 0.25 stars is added. If all these steps are carried out through an app that has active geolocation and confirms some parameters the user receives an additional 0.5 stars to their rating.

By uploading documents for professional skills or links to social media or other parameters this rating may increase further. The rating can be numeric or symbolic (stars, picture drawings) and always progressive. The Rating can also be divided according to categories that the user chooses. For example, if the user only wants an identity check and receives the maximum rating, he can do so and he will receive a maximum of 5 stars on his identity. Same for professional skills or other categories. Then there is the most prestigious "total rating", which takes into account many factors and is the most reliable of all.

It is also contemplated that invention may incorporate penalties and rewards, for example, adding or deducting tokens. Penalties or rewards may be related to a "task" or an "assignment" that refer to action items a user must perform or complete, such as within a predefined interval of time.

An example of an assignment may be for the user to always update and maintain the validity of their ID documents.

The instant invention further includes the automatic creation of a script that the user can insert onto socials media sites, e-mails, and/or applications that communicate through the Internet and which create the concept of rating portability.

The system and methods of the instant invention may operate over a global area network (GAN), such as the Internet, a wide area network (WAN), a local area network (LAN), or any other type of network or combination of the network. According to the instant invention a mobile device may generate data using sensors with or without a network connection. If a network connection is not available, data can be stored and transmitted upon the availability of a working connection.

It is also contemplated that errors caused by non-human verification can be reduced by validating more parameters provided by the user, such as social presence, websites, links, pictures, and a circle of people.

The instant invention may also include an advertisement server. The advertisement server facilitates targeted advertising based on the user data, for example, the rating received by the user. In this case we introduce the concept of the rated user or rated company that is very valuable in advertising. Other normal parameters may include geolocation, sex, demographic information, yearly earnings, and other parameters that users provide.

The advertisement server is adapted to access the database of the data server. Based on the data accessed, the advertisement server selects and sends a targeted advertisement—text, image, video, audio—to the user device.

One important aspect of the instant invention is that it provides a decentralized data system working with a Blockchain. The decentralized data system may be used with a smart contract so that users can automatically sell and share some personal data with potential purchasers.

Additionally, the decentralized data system may be used without having to supply personal data that could compromise the security of the user.

The instant invention is also adaptable to work with any existing network. Special API language allows external companies to use this technology and brand with proper logos and/or commercial names.

Moreover, the instant invention enables a variety of statistics to be gathered. These statistics may be valuable for economic analyses and determining consumer trends.

In certain embodiments, the instant invention may utilize a user's silhouette, particularly the physical form. As an example, a user's silhouette is compared at two different time periods. If the silhouette improved (i.e., smaller) the personal rating can be improved and their total rating will improve accordingly.

The system and methods of the instant invention may also include a social media platform and a chat forum for communication between users thereby creating a rated community of users.

Although the instant invention is discussed with respect to a rating result from verified information, the ratings may also be derived from user movements detected by smartphone sensors. In fact, with a verified mobile phone and an app the user can inform the system about their movements, behavior, geographical location, visited websites, and additional details that can increase the rating and provide error reduction for the rating calculation.

The usage of the external sensors in a mobile device, especially thanks to a measurement of kinetic energy and movements, increase the rating reliability and the total user rating.

The instant invention and its attributes and advantages may be further understood and appreciated with reference to the detailed description below taken in conjunction with the accompanying drawings.

DESCRIPTION OF THE DRAWINGS

The accompanying drawings, which are incorporated in and constitute a part of this specification, illustrate an implementation of the invention and together with the description serve to explain the advantages and principles of the invention.

DETAILED DESCRIPTION

Embodiments of the instant invention will now be described more fully hereinafter with reference to the accompanying drawings, in which some, but not all, embodiments of the invention are shown. Indeed, the instant invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

This disclosure is not limited to the particular systems, and methodologies described herein, as there can be multiple possible embodiments of the present disclosure which are not expressly illustrated in the present disclosure. It is also to be understood that the terminology used in the description is for describing the versions or embodiments only, and is not intended to limit the scope of the present disclosure.

Various operations may be described as multiple discrete operations in turn, in a manner that may be helpful in understanding embodiments of the present invention; however, the order of description should not be construed to imply that these operations are order dependent.

The description may use the phrases "in an embodiment," or "in various embodiments," "in one embodiment" "in another embodiment" "in some configurations," or "in some instances," which may each refer to one or more of the same or different embodiments, configurations, or instances. Furthermore, the terms "comprising," "including," "having," and the like, as used with respect to embodiments of the present invention, are synonymous with the definition afforded the term "comprising.

The terms "coupled" and "connected," along with their derivatives, may be used. It should be understood that these terms are not intended as synonyms for each other. Rather, in particular, embodiments, "connected" may be used to indicate that two or more elements are in direct physical contact with each other. "Coupled" may mean that two or more elements are in direct physical or electrical contact. However, "coupled" may also mean that two or more elements are not in direct contact with each other, but yet still cooperate or interact with each other.

Figure 1:
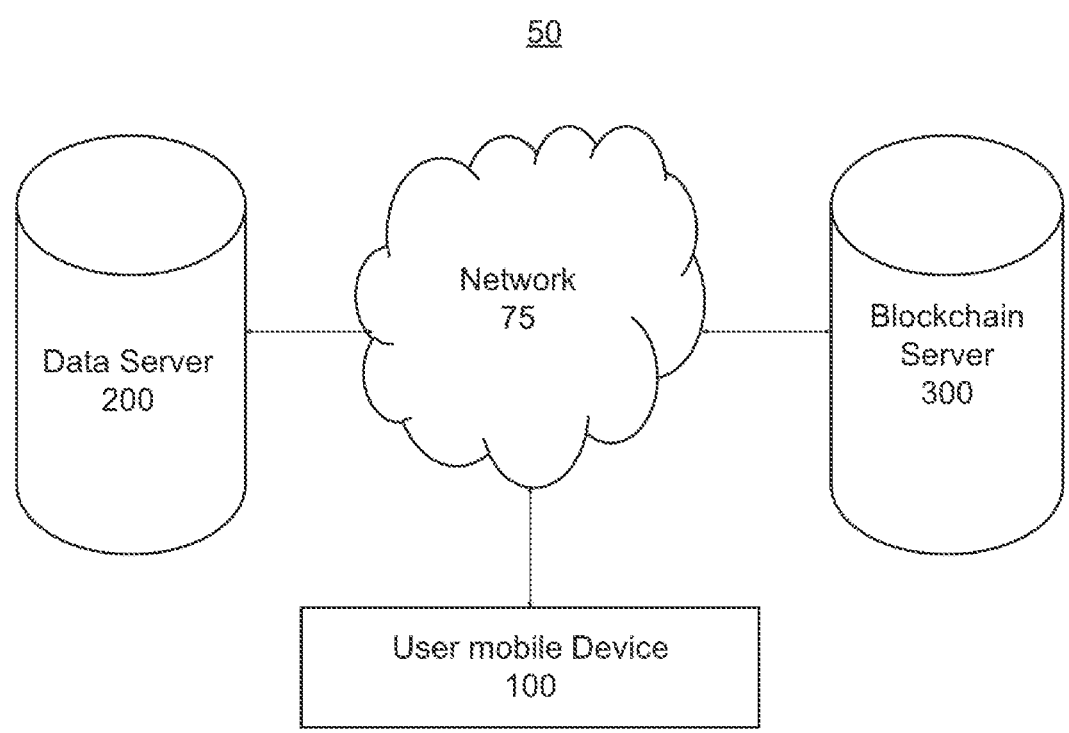
FIG. 1 illustrates a block diagram of a portable rating system according to an embodiment of the invention.

Referring to FIG. 1, a portable rating system 50 is shown according to an embodiment of the present disclosure. The portable rating system 50 includes a user mobile device 100, a data server 200, a blockchain server 300 and a network 75. The data server 200, the blockchain server 300 and the mobile device 100 are in communication with the each other via the network 75.

Figure 2A:
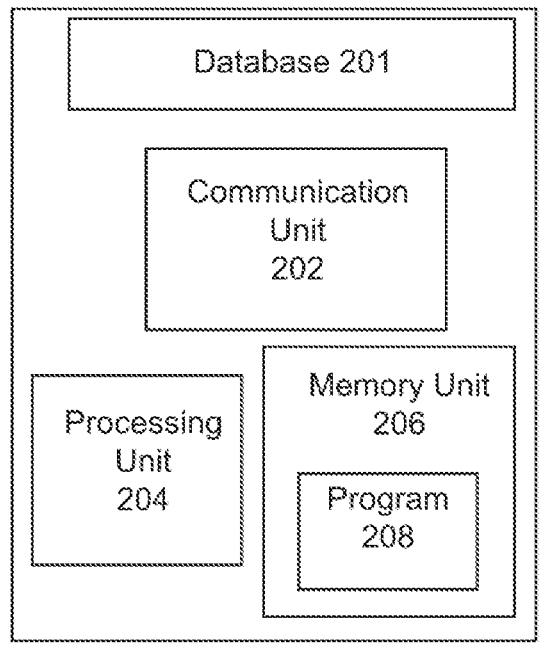
FIG. 2A illustrates a block diagram of a data server according to an embodiment of the invention.

Referring to FIG. 2A, the data server 200 is comprising, a database 201, a communication unit 202, a processing unit 204 and a memory unit 206 including a software program 208. The database 201 stores the data and may also store the tasks or assignments that refer to an action a user must perform or complete.

Figure 2B:
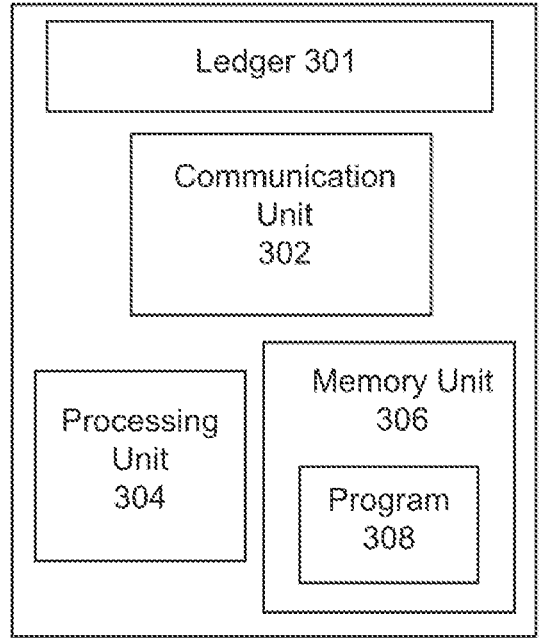
FIG. 2B illustrates a block diagram of a blockchain server according to an embodiment of the invention.

Referring to FIG. 2B, the blockchain server 300 may comprising a ledger 301, a communication unit 302, a processing unit 304 and a memory unit 306 including a software program 308.

Figure 3:
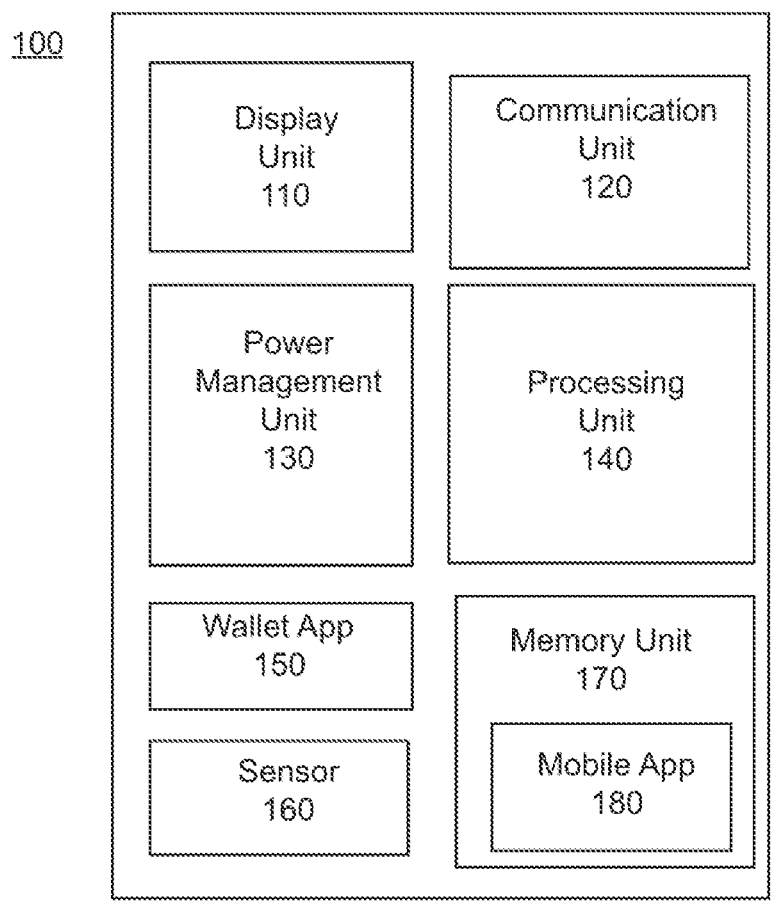
FIG. 3 illustrates a block diagram of a mobile device according to an embodiment of the invention.

Referring to FIG. 3, the mobile device 100 is having, a display unit 110, a communication unit 120, a power management unit 130, a processing unit 140, a wallet App 150, a sensor 160 and a memory unit 170 including a mobile application 180.

The blockchain server 300 is operatively coupled, via a network 75, to the data server 200 and the mobile device 100. It is contemplated the mobile device 100, data server 200, and blockchain server 300 communicate in real-time or according to an automatic script.

The data server 200 is adapted to receive information from the user mobile device 100, wherein the information is analyzed by the software program 208, stored in the memory unit 206 which utilizes one or a plurality of software for creating a rating, and then validated by the Blockchain server 300 via network 75. The method allows the data server 200 to convert the information received into at least one personal rating. Further, the method allows the data server 200 to send the user at least one token to a blockchain server 300 every time the update new information correctly. Furthermore, the method allows the blockchain server 300 to send the at least one token to the user's wallet 150.

Examples of network 75 in which the portable rating system 50 may operate includes, a global area network (GAN), such as the Internet, a wide area network (WAN), a local area network (LAN), or any other type of network or combination of networks. It is contemplated that the network may provide for wireline, wireless, or a combination of wireline and wireless communication between devices and servers. The network may be a system specific distributive network receiving and distributing specific network feeds and identifying specific network associated triggers.

The data provided by the user can be verified by the data server in various ways as follows.

The user provides his personal ID document, like a passport or identity card. In this case, Artificial Intelligence can verify the document from a data bank in real time, check the format of the document, and/or check the integrity of the picture and other important parameters.

The data server may verify the user mobile phone number by a code that they receive and needs to be sent to the server to be confirmed. Thirdly, the user can upload a personal or group picture. In this case, an algorithm can verify that pictures were not manipulated; and another algorithm can verify the face and silhouette between pictures and verify that they are of the same person in the information provided.

The user can provide their personal fingerprint or DNA information.

The user can provide information of movement or kinetic energy data recorded by sensors located in the user mobile device.

Further, the user may upload other personal pictures or update other personal data.

The system and the method also provide for the use of web spiders in order to analyze information provided and compare it with collected data. For example, if a user claims to have written novels a crawler searches the information network in this regard, and if it finds this information their rating will improve. In some cases, manual analysis of information is also provided.

The algorithm provided takes into account these multiple factors and then determines a final ranking that can be updated constantly. For example, verification of the single identity document can receive one rating star. If the verification is done on two documents (i.e., a passport and a health card) it can receive 1.25 stars. If the user adds a user mobile phone and is verified by sending a code that the user receives on the phone and is entered into an online form the user will receive an additional 0.5 stars to their rating. If the user then uploads one photograph that is verified and compatible with the one used in the passport there an additional 0.25 stars is added. If three more photos of which one is in a group, a further 0.25 stars is added. If all these steps are carried out through an app that has active geolocation and confirms some parameters the user receives an additional 0.5 stars is added to their rating.

The data server 200 further uses the software program 208 to assign a portable rating. The data server 200, alone or in addition to the blockchain server 300 and/or user mobile device 100 (FIG. 3), may include all or a portion of a software program 208 for assigning the rating. The database 201 stores data and may also store the tasks or assignments that refer to an action a user must perform or complete. Any data stored in the database 201 can be communicated to the blockchain server 300 or mobile device 100 including, for example, a wallet application 150 or mobile application 180 of the mobile device 100.

Further, the blockchain server 300 (FIG. 2B), alone or in addition to the data server 200 and/or mobile device (FIG. 3), may include all or a portion of a software program for assigning rating according to the invention. The blockchain server 300 includes a distributed ledger 301 that stores data including, but not limited to, smart contract logic and rules, such as user accounts, user account resource availability, associated logic and rules, and the like. It is contemplated that the distributed ledger 301 may associate with applications having computer-executable program code and may further instruct the mobile device 100 (i.e., processing unit 140 to operate the communication unit 120 in FIG. 3) to perform certain communication functions. It is also contemplated that the distributed ledger 301 may associate with applications having computer-executable program code and may further instruct the mobile device 100 (i.e., processing unit 140 in FIG. 3) to perform certain logic, data processing, and data storing functions of the software program 308 according to the invention.

The communication unit 202 of the data server 200 and the communication unit 302 of the blockchain server are in communication with the network 75 and the mobile device 100 is in communication with unit 120. Further, the mobile device 100 also has a display unit displaying the data from the blockchain server 300 and the data server 200. Further, the sensor 160 may be adapted to obtain a series of information from a user in the form of data, including fingerprints, DNA, face recognition, retina scan etc., and documents. The server uses software that includes the use of technologies including Artificial Intelligence, spiders crawlers, and photographic or video analysis with verification of the authenticity of such information. On the basis of the quality and quantity of the information received the software processes a rating and makes it available to the user. For this purpose the mobile device 100 is enabled with a plurality of sensors required to collect data from the user. The power management unit includes a battery to provide power to the mobile device and the memory unit 170, which stores mobile application 180 and controls the functions of the portable rating system 55. The mobile application also allows the user to store money in their wallet app 150 for transactions.

According to the invention, a mobile device 100—otherwise referred to as "user device—can be any electronic device capable of receiving and/or storing data, for example, any handheld device, personal digital assistant (PDA), mobile phone, smartphone, personal computing device, tablet computer, wearable devices, to name a few.

The software program stored in one or more memory units is adapted to perform following step: recording the sensor data of a user from the user during a time period; selecting data recorded by a gyroscope, GPS, accelerometer sensor or a combination of them; assigning a rating for the data recorded; transfer data by the data server to the blockchain server the data recorded; reward the user with cryptocurrency tokens.

Figure 4:
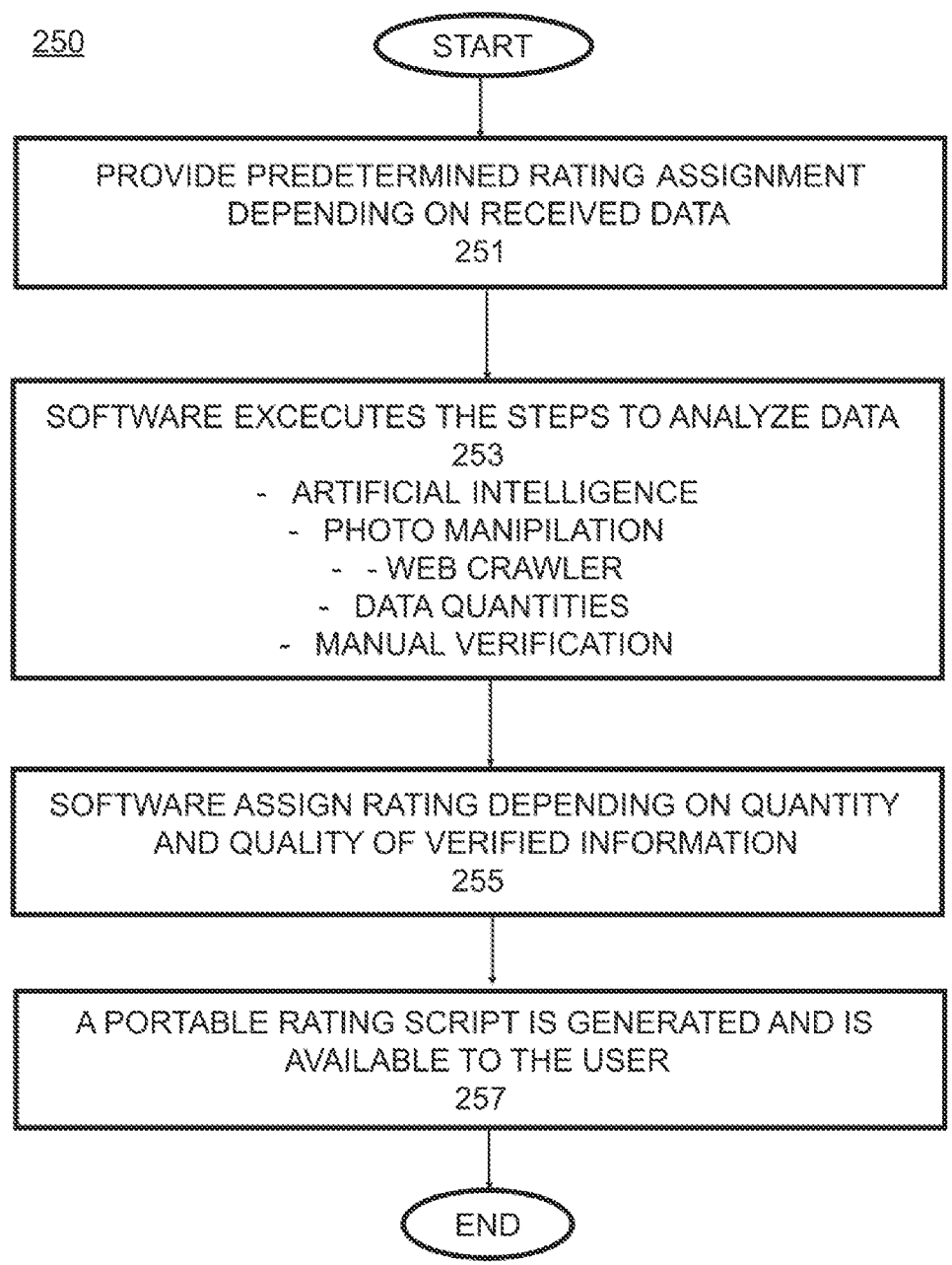
FIG. 4 illustrates a flowchart of a method for generating a portable rating script based according to an embodiment of the invention.

Referring to FIG. 4, a flowchart 250 is shown in which a user provides data to the system 55 through the mobile device 100 or any other suitable device at step 251, the software executes various method to analyze the data authenticity at step 253 with the help of, artificial intelligence, photo manipulation, web crawler, data quantities, and manual verification. The software assigns a rating based on the provided information and verification at step 255. Further, the software generated by the software and is made available to the user for further use at step 257.

Figure 5:
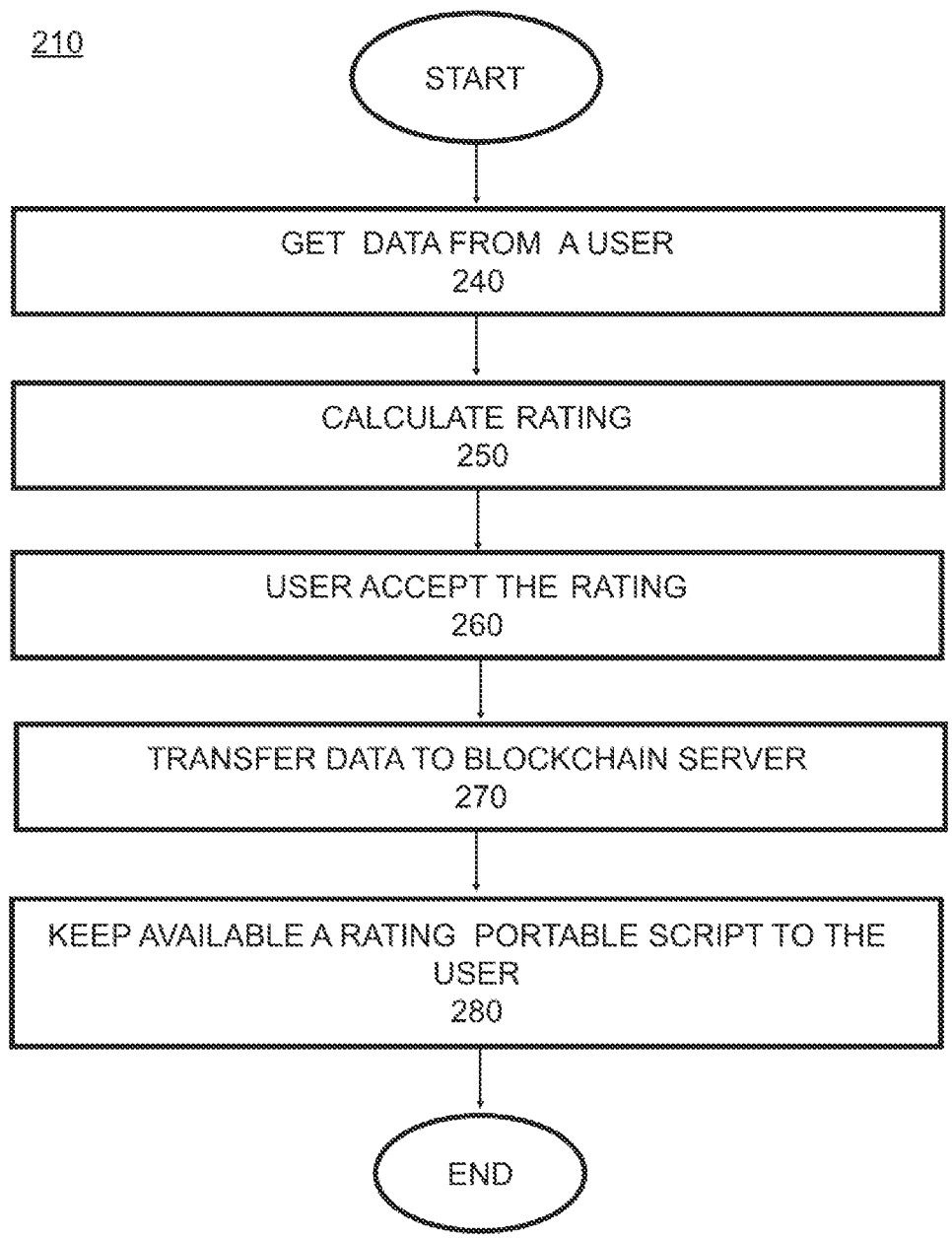
FIG. 5 illustrates a flowchart of a method for determining ranking generation based on data verification according to an embodiment of the invention.

Referring to FIG. 5, a flowchart 210 is shown in which a user sends data to the application at step 240. The application calculates the rating at step 250. Once the user accepts the rating provided by the application at step 260. The application transfers the rating to the blockchain server at step 270, and the system 55 keeps the rating portable script ready for the user at step 280.

Figure 6A:
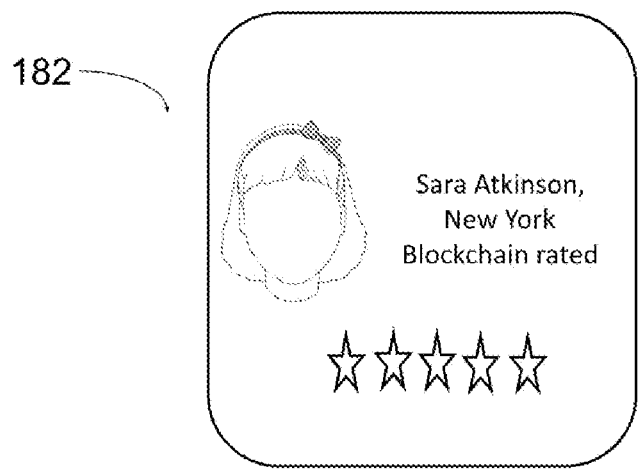
FIG. 6A illustrates a screenshot of the display of the portable graphics rating badge according to an embodiment of the invention.
Figure 6B:
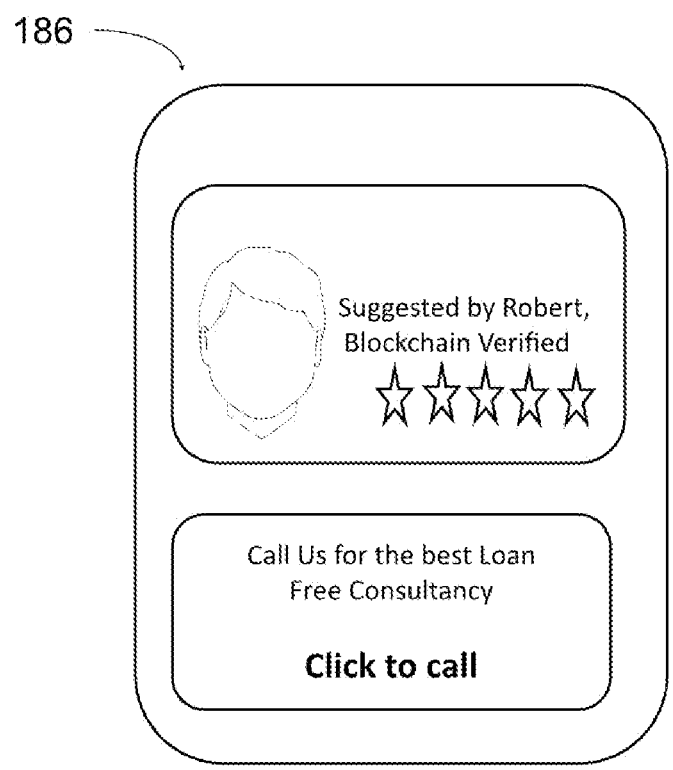
FIG. 6B illustrates a screenshot of the display of the advertising within the portable graphics rating badge according to an embodiment of the invention.

Referring to FIG. 6A a screenshot 182 of the display of the portable graphics rating ready for the user is shown.

Figure 7:
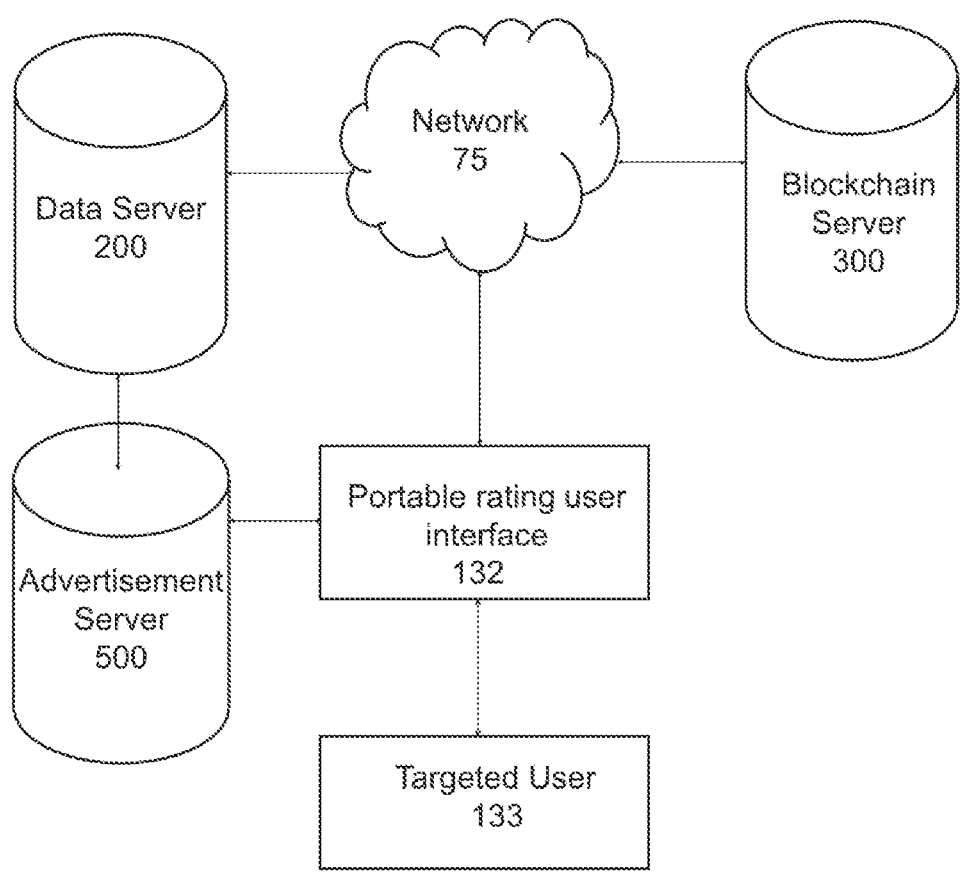
FIG. 7 illustrates a block diagram of a system including an advertisement server according to an embodiment of the invention.

Referring to FIG. 7, a portable rating system 55 is shown according to a second embodiment of the present disclosure. In this, an advertising server 500 is using the portable rating 132 for a targeted user 133 with the help of portable rating system 50. The advertisement server 500 facilitates targeted advertising based on the user data, for example, the rating received by the user. In this concept the rated user or rated company are very valuable in advertising. Other normal parameters can be geolocation, sex, demographic information, yearly earnings and some parameters that users provided are also important.

The advertisement server 500 is adapted to access the database 201 of the data server 200. Based on the data accessed, the advertisement server 500 selects and sends a targeted advertisement—text, image, video, audio—to the mobile device 100.

One important aspect of the invention is that it provides a decentralized data system working with Blockchain technology. The decentralized data system may be used with a smart contract so that users can automatically sell and share some personal data with potential purchasers.

Additionally, the decentralized data system may be used without having to supply personal data every time that could compromise the security of the user.

According to another embodiment of the present invention, the system provides an advertising server that can display targeted advertising within the user rating graphical interface depending on one or a combination of data like geolocation, ranking assigned, socioeconomic data, fitness activity, user abilities, personal identification data.

For example, a company could wish to deliver advertising only to users that are rated more than X, in this way the company is sure to deliver advertising to verified users, to the proper location, and with real socio-economic information.

Referring to FIG. 6A, a screenshot 186 of the display of the advertising within the portable graphics rating is shown according to the second embodiment of the present disclosure.

The verified data is related to one or more of a combination of personal identification data, user abilities, user picture combination, user financial information, user geo-demographic information, and user kinetic energy movements.

The user can update verified information within a period of time and the blockchain server will update a token in the user wallet for each verified update.

Further, according to an embodiment of the present disclosure discloses a personal rating is assigned based on data verification, wherein a memory unit stores a software program executable by one or more processing units, the method comprising the steps of: recording by a user device data from a user; calculating by a data server a rating to be assigned; transferring by the data server to a blockchain server verified data; transferring by the data server to external devices a graphical assigned user rating; and displaying the graphical user rating to public.

In some embodiment of the present invention, the system and the method include software and or device filters that exclude virtuous manipulations by users. In fact, for example, engine search and social presence can be measured, or other parameters, thereby reducing alterations by external factors.

In some embodiment of the present invention, the system and the method include the usage of smartphone and mobile devices.

The methods including algorithms described according to the invention may be included directly in hardware or software programs, software applications executed by a processor, or in any combination. The software may reside in the RAM, flash memory or a read-only memory (ROM), in a programmable memory (PROM) or in an EPROM, EEPROM, registers, hard disks, removable disks, compact disks or another form of storage medium known in the present state of the art. A storage medium, i.e., database, is combined with a processor so that the processor can read the information and write onto the storage medium. Alternatively, the storage medium may reside in a specific integrated circuit (ASIC). The ASIC may reside in a device, a computer, an operating terminal or a mobile device. Alternatively, the processor and the storage medium may reside as electronic components with a single circuit in a device, a computer, an operating terminal or a mobile device.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s).

In the preferred embodiment of the instant invention, a method for assigning a user rating based on data verification includes steps wherein user data is compiled and stored within the user device 100; wherein the data server 200 is adapted to receive, store, and verify the user data therein; wherein the data server is adapted to compare the user data received from the user device to the user data and determine a percentage of accuracy therebetween for use in creating a user rating; and wherein the data server is adapted to send the user rating to the blockchain server 300 through electronic network 75 and an electronic network connected therebetween. The blockchain server is adapted to receive, store, and transmit verified user data from the data server. And wherein a software program is encoded onto the user device and the data server and is adapted to compare the user data received from the user device to user data received from the electronic network and determine a percentage of accuracy therebetween for use in creating the user rating.

The user rating will coincide with the determined percentage of accuracy between the user data received from the user device and the user data received from the electronic network, and is adapted to be used to project a level of confidence of the user's identity and honesty. The percentage of accuracy is based upon the number of inaccuracies determined between the user data received from the user device and user data received from the electronic network.

The user data received from the user device and the user data received from the electronic network may be chosen from a list of user data including photographs of the user, fingerprints of the user, DNA of the user, kinetic energy transmitted by the user to said user device while using said user device, and personal information of the user.

The user device may also include sensors including a gyroscope, a biosensor, a motion sensor, a light sensor, a pressure sensor, an oximeter, a sweat sensor, a tactile sensor, a camera, a piezoelectric transducer, a pedometer, an accelerometer, a pulse sensor, a global positioning system (GPS), a magnetometer, a passive infrared (PIR) device, a smart watch, an altimeter, and a barometer adapted to detect movements, health status, and geographical location of the user.

The data received from said electronic network may include information retrieved from websites and social media selected from a group of information consisting of keywords, pictures, audio, and video to measure an internet presence of the user.

Inaccuracies of the photographs is determined by detecting splicing, wherein parts of two different images are combined; detecting copying and moving, wherein objects in a photograph have been moved or cloned from one place to another; detecting parts removed, wherein an object has been removed from a photograph; detecting parts added, wherein an object has been added to a photograph; analyzing contrasting edges; detecting deliberately smoothed areas; and detecting different visual noise patterns. Inaccuracies of the photographs can be determined by analyzing the face and silhouette of the user between a plurality of pictures and determining if it is the same person in the photographs.

User data may be in the form of a verification code adapted to be inputted into the user device by the user; wherein the verification code is compared to a user code sent by an external server through the electronic network to the data server. User data may further be in the form of personal information adapted to be inputted into the user device by the user; wherein the updated personal information is compared to known personal information gathered by external servers through the electronic network and sent to the data server.

The user rating is adapted to dynamically update in correlation to the amount of personal information verified and updated by the user in a determined period of time. The user rating is the final result of a sum of chosen verified personal information, wherein each of said chosen verified personal information has a different rating weight. Each piece of verified information receives a predetermined percentage of a star, wherein the user rating is based on the number of stars received. The user rating can be displayed in a social network where only verified users are accepted and where only verified users can interact each other adding value to their profiles and becoming verified influencers.

User data may be adapted to be used by the user to receive cryptocurrencies as a reward to have provided the user data.

When the user rating reaches a predetermined level a badge 182 is created for use by the user and sent through the data server to the electronic network, wherein the badge represents a positive user rating. The badge is then dynamically updated in real time and is adapted to be used on social media, email communications, and websites to show user reputation and trust. The badge is also adapted to display an advertising message; wherein said advertising message is chosen from a group of types of advertising messages consisting of audio, video, text, and pictures. The badge is adapted to be customized by an API program from third parties with proper branding or logos. The badge is adapted to display a user rating for a category chosen by the user including a business sector, social media presence, credit reputation, education level, and lifestyle. The badge is further adapted to be posted in a dedicated platform for communication between users thereby creating a rated community of users.

Data received from the electronic network can also be used with a smart contract so that users can automatically sell and share some personal data with potential purchasers.

While the disclosure is susceptible to various modifications and alternative forms, specific exemplary embodiments of the invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

Reasonable variations and modifications of the illustrated examples in the foregoing written specification and drawings are possible without departing from the scope of the invention. It should further be understood that to the extent the term "invention" is used in the written specification, it is not to be construed as a limited term as to number of claimed or disclosed inventions or the scope of any such invention, but as a term which has long been conveniently and widely used to describe new and useful improvements in technology. The scope of the invention supported by the above disclosure should accordingly be construed within the scope of what it teaches and suggests to those skilled in the art.

What is claimed is:

1. A computer implemented method for dynamically determining a user rating associated with the validity of an identity associated with a virtual presence of a user, the computer implemented method comprising:
obtaining, by a trust rating system, first user data from a user device, the first user data comprising identity information associated with the identity of a user;
obtaining first verification data from at least one verification source, the first verification data associated with previously verified information;
determining a verification status of the first user data;
computing a user rating score based on the verification status, wherein the user rating score provides an indication of the validity of the identity of the user;
storing the first user data and first verification data on at least one of a data server and a blockchain server;

obtaining, by the trust rating system, second user data from a user device, the second user data comprising identity information associated with the identity of the user;

obtaining second verification data from at least one verification source, the second verification data associated previously verified information;

determining a verification status of the second user data;

updating the computed user rating score based on the verification status of the second user data, wherein the user rating score is increased if the verification status of the second user data is verified;

storing the user rating on at least one of a data server, and a blockchain server; and providing the user rating for display on at least one user device or via at least one social media platform, wherein display of the user rating provides an indication to other users of the validity of the identity associated with a virtual presence of the user.

2. The computer implemented method according to claim 1, wherein the first user data comprises at least one of an image of the user, an image of a document, and an image of an identification card.

3. The computer implemented method according to claim 1, further comprising comparing the first user data with the first verification data to determine a percentage match between the first user data and the first verification data.

4. The computer implemented method according to claim 3, wherein the verification status is determined as verified when the percentage match meets or exceeds a threshold and a status of unverified when the percentage match is below the threshold.

5. The computer implemented method according to claim 1, further comprising comparing the second user data with the second verification data to determine a percentage match between the second user data and the second verification data.

6. The computer implemented method according to claim 5, wherein the verification status is determined as verified when the percentage match meets or exceeds a threshold and a status of unverified when the percentage match is below the threshold.

7. The computer implemented method according to claim 1, wherein the user rating is increased, decreased, or remains unchanged based on the verification status of the second user data.

8. The computer implemented method according to claim 1, further comprising storing the computed user rating score in a database in association with an identifier associated with the user.

9. The computer implemented method according to claim 1, further comprising providing a plurality of users of the trust rating system with access to the user rating score.

10. The computer implemented method according to claim 9, wherein the access to the user rating score is provided in real-time so that users have access to up to date changes in the user rating score.

11. The computer implemented method according to claim 1, wherein at least one of the first verification source and second verification source is external to the data server and/or blockchain server.

12. The computer implemented method according to claim 1, wherein at least one of the first verification source and second verification source comprise previously verified information.

13. The computer implemented method according to claim 1, wherein the verification status comprises a status of verified, unverified, or undetermined.

14. The computer implemented method according to claim 1, wherein said user rating is a final result of a sum of a plurality of computed metrics, wherein each of the plurality of computed metrics is associated with a different rating weight.

15. The computer implemented method according to claim 14, wherein the rating weight is determined based on the type of user data verified.

16. The computer implemented method according to claim 1, wherein the second user data is obtained at a different time than the first user data.

17. The computer implemented method according to claim 1, wherein updating the user rating comprises updating the user rating based on user data obtained within a determined period of time.

18. The computer implemented method according to claim 1, wherein updating comprises dynamically updating the user rating in correlation to the verification status of a plurality of user data elements as determined in a determined period of time.

19. A computing system for dynamically determining a user rating associated with the validity of an identity associated with a virtual presence of a user, the computing system comprising:

at least one computing processor; and memory comprising instructions that, when executed by the at least one computing processor, enable the computing system to:

obtain, by a trust rating system, first user data from a user device, the first user data comprising identity information associated with the identity of a user;

obtain first verification data from at least one verification source, the first verification data associated with previously verified information;

determine a verification status of the first user data;

compute a user rating score based on the verification status, wherein the user rating score provides an indication of the validity of the identity of the user;

store the first user data and first verification data on at least one of a data server and a blockchain server;

obtain, by the trust rating system, second user data from a user device, the second user data comprising identity information associated with the identity of the user;

obtain second verification data from at least one verification source, the second verification data associated previously verified information;

determine a verification status of the second user data;

update the computed user rating score based on the verification status of the second user data, wherein the user rating score is increased if the verification status of the second user data is verified;

store the user rating on at least one of a data server, and a blockchain server; and provide the user rating for display on at least one user device or via at least one social media platform, wherein display of the user rating provides an indication to other users of the validity of the identity associated with a virtual presence of the user.

20. A non-transitory computer readable medium comprising instructions that when executed by a processor enable the processor to:

obtain, by a trust rating system, first user data from a user device, the first user data comprising identity information associated with the identity of a user;

obtain first verification data from at least one verification source, the first verification data associated with previously verified information;

determine a verification status of the first user data;

compute a user rating score based on the verification status, wherein the user rating score provides an indication of the validity of the identity of the user;

store the first user data and first verification data on at least one of a data server and a blockchain server;

obtain, by the trust rating system, second user data from a user device, the second user data comprising identity information associated with the identity of the user;

obtain second verification data from at least one verification source, the second verification data associated previously verified information;

determine a verification status of the second user data;

update the computed user rating score based on the verification status of the second user data, wherein the user rating score is increased if the verification status of the second user data is verified;

store the user rating on at least one of a data server, and a blockchain server; and provide the user rating for display on at least one user device or via at least one social media platform, wherein display of the user rating provides an indication to other users of the validity of the identity associated with a virtual presence of the user.

* * * * *